United States Patent [19]

Todoroki et al.

[11] Patent Number: 4,651,078
[45] Date of Patent: Mar. 17, 1987

[54] DEVICE FOR DRIVING AN INDUCTION MOTOR

[75] Inventors: Yukio Todoroki, Amagasaki; Makoto Seto; Kimihiro Yanagihara, both of Kobe; Sadanari Yano, Nishinomiya, all of Japan

[73] Assignee: Mitsubishi Denki Kabushiki Kaisha, Tokyo, Japan

[21] Appl. No.: 664,862

[22] Filed: Oct. 25, 1984

[30] Foreign Application Priority Data

Nov. 4, 1983 [JP] Japan ............................ 58-207752

[51] Int. Cl.⁴ ............................................. H02P 5/40
[52] U.S. Cl. ...................................... 318/798; 318/806
[58] Field of Search ................................. 318/798, 806

[56] References Cited

U.S. PATENT DOCUMENTS

| 3,671,831 | 6/1972 | Chausse et al. | 318/800 |
| 3,769,564 | 10/1973 | Rettig | 318/803 |
| 3,983,464 | 8/1976 | Peterson | 318/327 |
| 4,160,940 | 7/1979 | Wolf | 318/808 |
| 4,240,020 | 12/1980 | Okuyama et al. | 318/800 |
| 4,322,671 | 3/1982 | Kawada et al. | 318/811 |
| 4,483,419 | 11/1984 | Salihi etal. | 318/759 |

OTHER PUBLICATIONS

"Thyristor Control of A. C. Motors", Murphy, Pergamon Press, 1973.

Primary Examiner—Jr. Smith
Attorney, Agent, or Firm—Leydig, Voit & Mayer

[57] ABSTRACT

The present invention relates to a device for driving an induction motor comprising:
a variable converter which converts an alternating current into a direct current;
an inverter device which converts a D-C output of said variable converter into an alternating current;
an induction motor driven by said inverter device;
a speed detector which detects the speed of said induction motor; and
a speed controller which amplifies a reference speed signal input to the inverter device and which provides as an output signal therefrom the difference between the reference speed signal and the speed of the induction motor;
wherein the output of said speed controller is changed depending upon the running speed of the induction motor.

2 Claims, 5 Drawing Figures

DEVICE FOR DRIVING AN INDUCTION MOTOR

BACKGROUND OF THE INVENTION

The present invention relates to a device for driving an induction motor.

The conventional device of this type which has been put into practice can be represented by a circuit system which is shown in FIG. 1, in which reference numeral 1 denotes a variable converter which converts an alternating current into a direct current. This converter is, for example, composed of a normal thyristor converter. Numeral 2 denotes a D-C reactor, numeral 3 denotes a smoothing capacitor, numeral 4 denotes an inverter which converts a direct current into an alternating current. This inverter is, for example, composed of a normal thyristor converter. Numeral 5 denotes an induction motor, numeral 6 denotes a speed generator, numeral 11 denotes the output of the speed generator, numeral 12 denotes a speed controller, which is, for example, composed of a normal operational amplifier. Numeral 13 denotes the output of the speed controller, numeral 14 denotes an adder for adding the speed generator output 11 and the speed controller output 13 together, and numeral 15 denotes the output of the adder 14.

The operation of the conventional device of FIG. 1 will be described here below. Under ordinary operating conditions, a reference speed signal and the speed generator output 11, which are applied to a first and second inputs of the speed controller 12, respectively, will be equal to each other. The adder 14 adds the output 13 of the speed controller 12 and the speed generator output 11 and the output 15 of the adder 14 serves as a reference input to the inverter 4. The output 13 of the speed controller 12 instructs the slip frequency of the induction motor 5, and is controlled depending upon the load. Further, the output 13 of the speed controller 12 is limited by a predetermined saturation value of the speed controller 12.

The conventional device for driving the induction motor has been constructed as described above. Therefore, the induction motor produces different torques even for the same slip frequency depending upon whether it is running at low speeds or at high speeds. When the induction motor is running at low speeds such as during the regenerative running, excessively large torque is produced and heavy currents flow, resulting in the tripping of the device.

SUMMARY OF THE INVENTION

The present invention was accomplished in order to eliminate the above-mentioned defects inherent in the conventional art, and has for its object to provide a device which changes the limiting value for the output of the speed controller responsive to the operation speed, so that the same torque is produced from a low speed through a high speed to ensure stable operation throughout the whole control range.

BRIEF DESCRIPTION OF THE DRAWINGS

In the drawings, the same symbols indicate the same or corresponding parts.

DESCRIPTION OF THE PREFERRED EMBODIMENT

Figure 1:
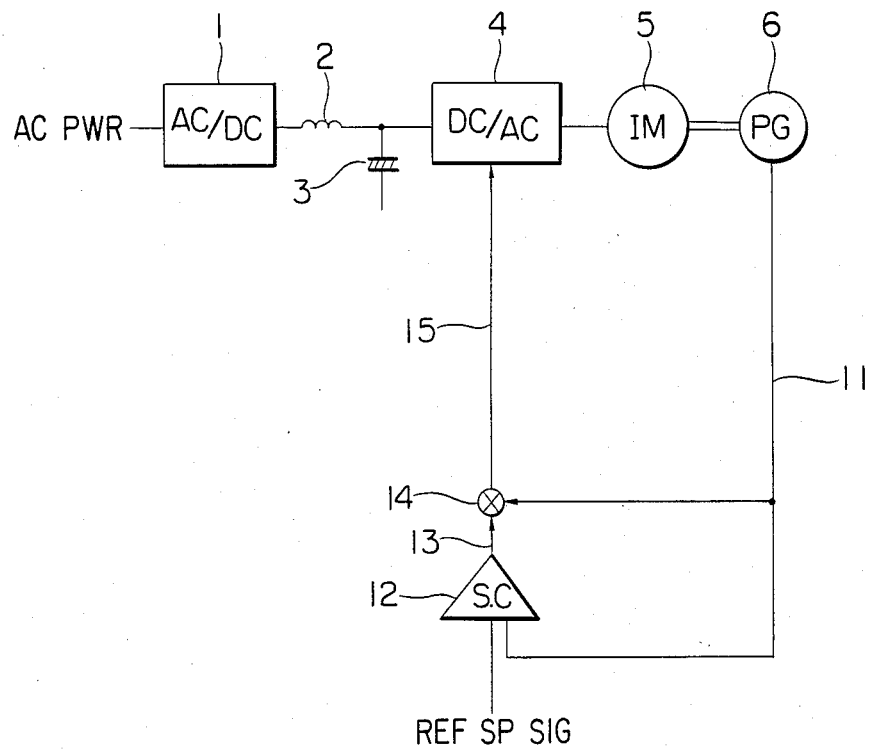
FIG. 1 is a block diagram showing a conventional device for driving an induction motor.

An embodiment of the present invention will be described below in conjunction with FIG. 2, in which the same reference numerals as those of FIG. 1 denote the same members, and reference numeral 20 denotes a limit value control circuit which controls the limiting value for the output 13 of the speed controller 12 depending upon the output 11 of the speed generator 6.

Figure 3:
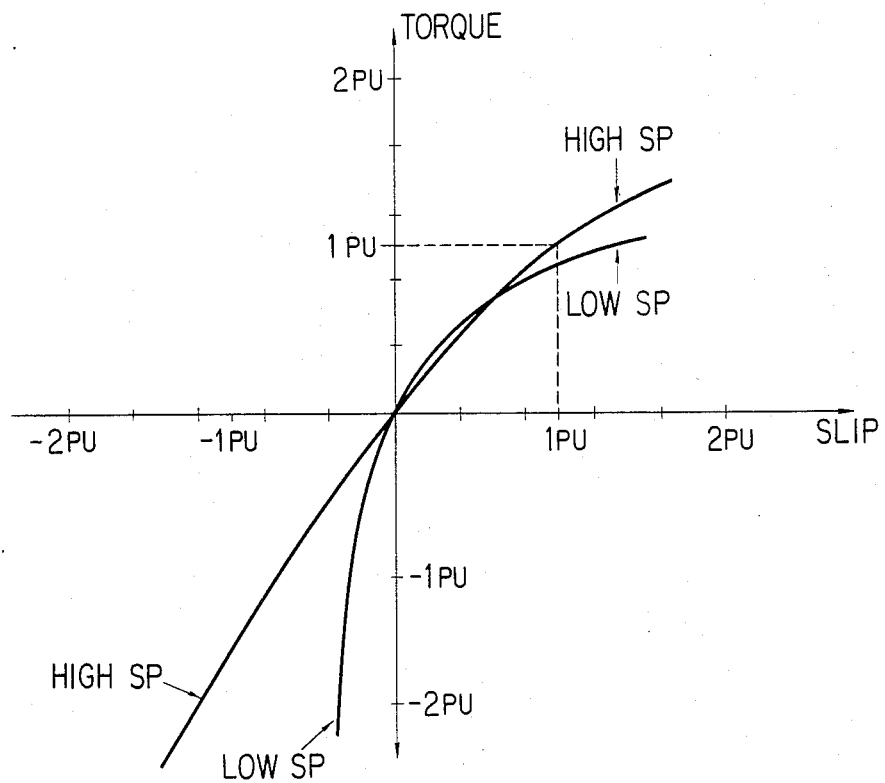
FIG. 3 is a diagram of slip-torque curves.

FIG. 3 shows representative slip frequency-torque curves, in which the abscissa represents the output 13 of the speed controller 12 and the ordinate represents the torque of the induction motor 5. The first quadrant represents a power running mode of operation, and the third quadrant represents a regenerative running mode of operation.

From FIG. 3, the following torque relations under the same slip frequency conditions can be observed:

Torque in power running mode:

Torque High speed > Torque low speed;
slip = constant

Torque in regenerative running mode:

Torque High speed < Torque low speed;
slip = constant

Unless the limiting value of the output 13 of the speed controller 12 is controlled as a function of the operation speed, therefore, the torque may become very small or excessively large depending upon the running speed, and stable operation cannot be expected.

Figure 2:
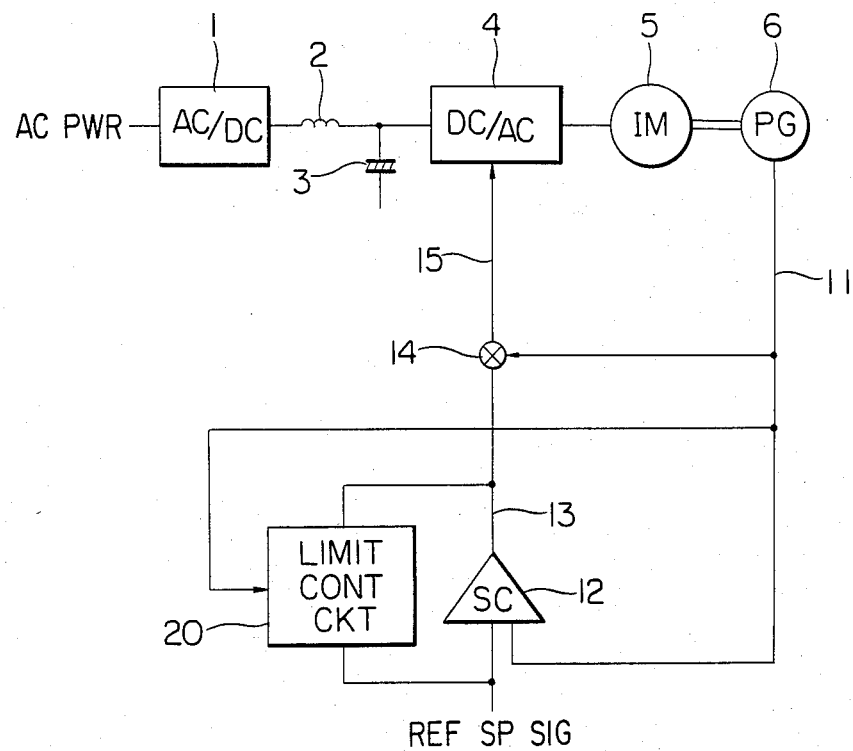
FIG. 2 is a block diagram of a device according to an embodiment of the present invention.

According to the circuit of the present invention shown in FIG. 2, the output 13 of the speed controller 12 is controlled by the limit value control circuit 20 depending upon the running speed, i.e. depending upon the output 11 of the speed generator 6. Namely, the limiting value for the output 13 is increased under the condition of low-speed power running, and is further increased by a small amount under the condition of high-speed power running. The limiting value for the output 13 is decreased under the low-speed regenerative running mode of operation. Under high-speed regenerative running mode of operation operation, the limiting value for the output 13 is decreased to be slightly smaller than that of the condition of high-speed power running. Further, the limiting value for the output 13 is controlled depending upon the output 11 of the speed generator 6, so that a constant torque is obtained from a low speed through a high speed to ensure a stable operation.

In the above-mentioned embodiment, the limit control circuit 20 is controlled by the speed generator 11. However, the same effects can also be obtained even when the limit control circuit 20 is controlled by a reference speed signal and a signal 15 which is inputed to the inverter circuit.

Figure 4:
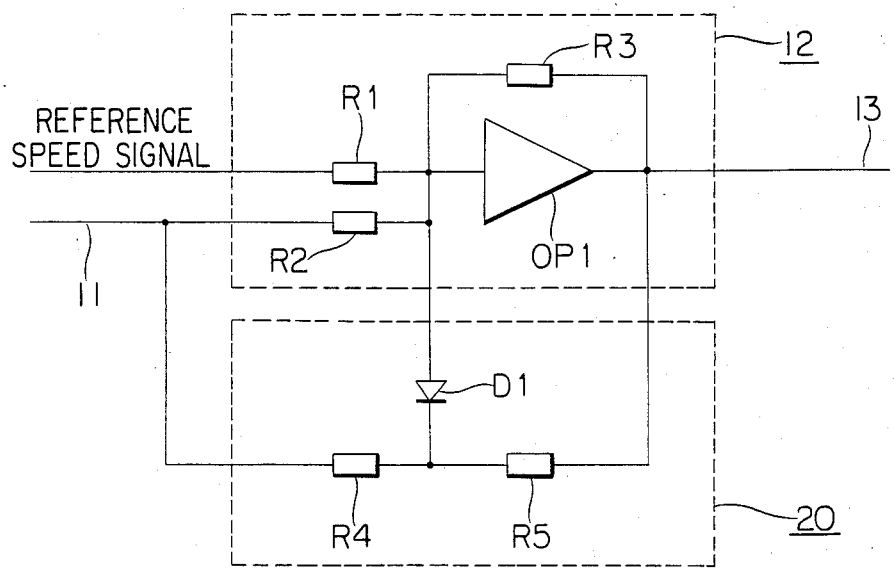
FIG. 4 is a block diagram showing examples of a speed controller and a limit control circuit.
Figure 5:
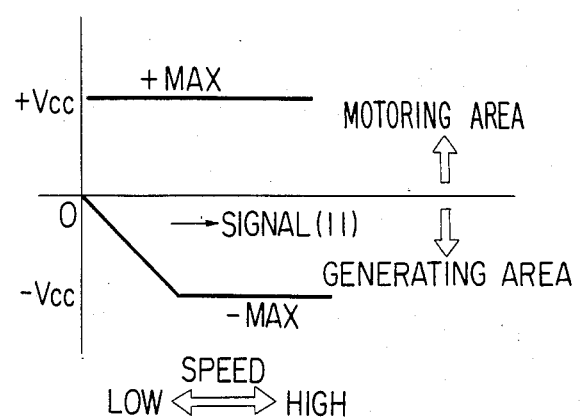
FIG. 5 is a view showing the description of the operation in FIG. 4.

FIG. 4 is a block diagram showing the examples of the speed controller 12 and the limit control circuit 20. In the drawing, R1 to R5 denote fixed resistors, D1 denotes a diode, and OP denotes an operational amplifier. FIG. 5 shows the state of the variation in the maximum level of the output 13 with respect to the output 11. In other words, the maximum value of the output of the operational amplifier OP1 can become a positive side power source voltage (+Vcc) of the operational amplifier irrespective of the value of the output 11 at the positive side level as shown in FIG. 5 depending upon the operations of the resistors R4, R5, and the diode D1. On the other hand, the negative side level decreases depending upon the operations of the resistors R4, R5 and the diode D1, the lower the level of the output 11 becomes. Therefore, assume that the output of the speed controller 12 is under the condition of power running at the positive side and under the condition of regenerative running at the negative side, the limiter level of the slip frequency of the motor 5 decreases under the condition of low-speed regenerative mode of operation, and excessive torque is not accordingly produced.

According to the present invention as described above, the limiting value for the output of the speed controller is controlled depending upon the running speed. Unlike the conventional device, therefore, the inverter device can be prevented from being tripped by a small torque or excessive torque.

What is claimed is:

1. A device for driving an induction motor and controlling its maximum torque at various motor speeds, said device comprising:
   a variable converter which converts an alternating current into a direct current;
   an inverter device which converts said direct current from said variable converter into an alternating current;
   an induction motor driven by said inverter device;
   a speed detector coupled to said induction motor for detecting the speed of said induction motor and generating a signal indicative thereof, said speed detector including an output for providing said signal indicative of motor speed;
   a speed controller which receives said signal from said speed detector and a reference speed signal and in response thereto provides a difference signal for controlling said inverter device, said speed controller including an input for receiving said signal indicative of motor speed and said reference speed signal and further including an output for providing said difference signal; and
   a limit control circuit responsive to said difference signal and said signal indicative of the speed of said induction motor for limiting the values of said difference signal to predetermined positive and negative limits in order to prevent the creation of excessive torques at low speed operation, said limit control circuit including a voltage divider means which has an intermediate node and is coupled between the output of the speed detector and the output of the speed controller and further including a diode means coupled between the intermediate node of the voltage divider means and the input of the speed controller.

2. A device as set forth in claim 1 wherein said limit control circuit dynamically changes the limits for said difference signal from said speed controller when said induction motor is running in a regenerative mode at low speeds.

* * * * *